(12) United States Patent
Lu

(10) Patent No.: US 11,564,078 B2
(45) Date of Patent: *Jan. 24, 2023

(54) GATEWAY RECOVERY PROCESSING METHOD AND DEVICE

(71) Applicant: ZTE CORPORATION, Shenzhen (CN)

(72) Inventor: Fei Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 45 days.

This patent is subject to a terminal disclaimer.

(21) Appl. No.: 17/104,325

(22) Filed: Nov. 25, 2020

(65) Prior Publication Data
US 2021/0084483 A1 Mar. 18, 2021

Related U.S. Application Data

(63) Continuation of application No. 15/752,056, filed as application No. PCT/CN2016/088206 on Jul. 1, 2016, now Pat. No. 10,893,404.

(30) Foreign Application Priority Data
Aug. 14, 2015 (CN) .......................... 201510502645.X

(51) Int. Cl.
*H04W 8/02* (2009.01)
*H04W 76/12* (2018.01)
*H04W 88/16* (2009.01)
*H04W 68/02* (2009.01)

(52) U.S. Cl.
CPC ............. *H04W 8/02* (2013.01); *H04W 68/02* (2013.01); *H04W 76/12* (2018.02); *H04W 88/16* (2013.01)

(58) Field of Classification Search
None
See application file for complete search history.

(56) References Cited

U.S. PATENT DOCUMENTS

| 2014/0153544 A1* | 6/2014 | Lu ........................... H04W 8/26 370/331 |
| 2015/0036611 A1* | 2/2015 | Kim .................. H04W 36/0022 370/329 |

* cited by examiner

*Primary Examiner* — Yemane Mesfin
*Assistant Examiner* — Jeff Banthrongsack
(74) *Attorney, Agent, or Firm* — George McGuire

(57) ABSTRACT

A method for gateway recovery processing and device, the method comprising: a first mobility management unit receiving Packet Data Network (PDN) connection signaling, and triggering a paging procedure for a terminal; in response to determining that the paging procedure fails, the first mobility management unit setting and storing flag information, wherein the flag information is used to indicate that the PDN connection signaling is in a suspended state; and in a case where the terminal moves from a coverage area of the first mobility management unit to a coverage area of a second mobility management unit, the first mobility management unit sending the flag information to the second mobility management unit, wherein the flag information is used for the second mobility management unit to trigger a Serving Gateway (SGW) to send a bearer update request message to a PDN Gateway (PGW).

6 Claims, 9 Drawing Sheets

When a terminal moves from a coverage area of a first mobility management unit to a coverage area of a second mobility management unit, the second mobility management unit receives flag information from the first mobility management unit — S402

The second mobility management unit sends the flag information to an SGW, the flag information being configured to trigger the SGW to send a bearer updating request message to a PGW — S404

GATEWAY RECOVERY PROCESSING METHOD AND DEVICE

CROSS-REFERENCE TO RELATED APPLICATIONS

This is a continuation application of U.S. application Ser. No. 15/752,056, which was a National Stage Application, filed under 35 U.S.C. 371, of International Patent Application No. PCT/CN2016/088206, filed on Jul. 1, 2016, which claimed the priority to Chinese patent application No. 201510502645.X filed with CNIPA on Aug. 14, 2015, the disclosures of which are incorporated herein by reference in their entireties.

TECHNICAL FIELD

The disclosure relates to the field of communications, and particularly to a method and device for gateway recovery processing.

BACKGROUND

At present, the standard workgroup of the 3rd Generation Partnership Project (3GPP) is working on researching evolution of a Packet Switch (PS) core and a Universal Mobile Telecommunication System Radio Access Network (UTRAN), with a research subject called as System Architecture Evolution (SAE), to achieve a purpose of enabling an Evolved Packet Core (EPC) to provide a higher transmission rate, generate a shorter transmission delay, simultaneously implement packet optimization and support mobility management between an Evolved UTRAN (E-UTRAN), the UTRAN, a Wireless Local Area Network (WLAN) and another non-3GPP access network.

A present SAE architecture, as shown in FIG. 1, includes the following network elements: an Evolved Radio Access Network (E-RAN), a Packet Data Network (PDN) and an EPC. The EPC includes the following network elements: a Mobility Management Entity (MME), a mobility management unit in a Universal Mobile Telecommunication System (UMTS) being a Serving General Packet Radio Service (GPRS) Support Node (SGSN); a Serving Gateway (SGW); a PDN Gateway (PGW); a Policy and Charging Rules Function (PCRF); and a Home Subscriber Server (HSS).

In a related technology, User Equipment (UE) may be in a Power Saving Mode (PSM), the PSM including a power saving state or an Extended Discontinuous Reception (eDRX) state. In the PSM, it is impossible for an MME to page the UE, and the UE is also in an unreachable state. At this moment, if the MME learns about the unreachable state of the UE after receiving bearer management signaling, the MME notifies a PGW of information indicating that the UE is temporarily unreachable. FIG. 2 shows steps when the MME receives the bearer management signaling in the related technology.

In Step 201, the PGW sends a bearer establishment request message to an SGW, the message containing bearer Quality of Service (QoS), a Traffic Flow Template (TFT), a charging Identifier (ID) and an uplink Tunnel Endpoint Identifier (TEID) of the PGW.

In Step 202, after the SGW receives the bearer establishment request message, the SGW forwards the bearer establishment request message to the MME, the message containing the bearer QoS, the TFT and an uplink TED of the SGW.

In Step 203, after receiving the bearer establishment request message, the MME checks a state of the UE, and if the UE is in an idle state and the UE activates the PSM, the MME starts performing a procedure for paging to an Evolved Node B (eNodeB), and simultaneously sets a paging timer; and after timeout of the paging timer, if the MME has yet not received any paging response, the MME determines that the paging procedure fails.

In Step 204, after receiving a paging message, the eNodeB starts to page the UE.

In Step 205, if not receiving any paging response before timeout of the timer in Step 203, the MME determines that paging fails; and the MME returns a bearer establishment response message to the SGW, the message containing a special cause value informing to the SGW that the UE is in the PSM and temporarily unreachable, and moreover, the MME sets a flag to indicate that PDN connection signaling initiated by a network is currently in a suspended state.

In Step 206, the SGW returns a bearer establishment response to the PGW, the response message containing the special cause value indicating the PGW that the UE is in the PSM and temporarily unreachable, the PGW receives the special cause value, and the PGW may try the same bearer establishment process only after receiving a bearer update request.

Although the UE is in the PSM, the UE may still move. When the UE moves to a new mobility management unit, as shown in FIG. 3, the mobility management unit may further select to provide service for the UE to the original SGW, and sends a message in Step 305 to the SGW. However, if the UE moves only in a system (for example, in an E-UTRAN system), maybe the SGW will not send any bearer update request message to the PGW. If the PGW does not receive a bearer update request, the PGW may always not initiate PDN connection signaling, which makes it impossible to transmit some downlink services to the UE for a long time.

In the related art, it is impossible to transmit a downlink service to UE due to the fact that a PGW cannot be notified that the UE moves to a new mobility management unit.

SUMMARY

The below is a summary about a subject described in the disclosure in detail. The summary is not intended to limit the scope of protection of the claims.

Embodiments of the disclosure provide a method for gateway recovery processing and device, which may implement notification to a PGW when UE moves to a new mobility management unit.

According to one aspect of the embodiments of the disclosure, a method for gateway recovery processing is provided, which may include that: when a terminal moves from a coverage area of a first mobility management unit to a coverage area of a second mobility management unit, the second mobility management unit receives flag information from the first mobility management unit, wherein the flag information may be used to indicate that PDN connection signaling is in a suspended state; and the second mobility management unit sends the flag information to an SGW, the flag information is used to trigger the SGW to send a bearer update request message to a PGW.

In one or more embodiments, the bearer update request message may carry the flag information.

In one or more embodiments, the flag information may be represented by using an Information Element (IE).

In one or more embodiments, before the operation that the second mobility management unit receives the flag information from the first mobility management unit, the method may include that: the second mobility management unit receives a Globally Unique Temporary UE Identity (GUTI) from the terminal; and the second mobility management unit searches for the first mobility management unit according to the GUTI.

In one or more embodiments, when the second mobility management unit receives the GUTI from the terminal, the method may further include that: the second mobility management unit receives an indication message from the terminal, wherein the indication message may be configured to indicate whether the terminal is capable of supporting an Idle state Signaling Reduction (ISR).

In one or more embodiments, the bearer update request message may further carry a source GPRS Tunnel Protocol-Control plane (GTP-C) ID corresponding to the first mobility management unit and a destination GTP-C ID corresponding to the second mobility management unit.

In one or more embodiments, after the operation that the second mobility management unit sends the flag information to the SGW, the method may include that: the second mobility management unit receives a response message of the bearer update request message from the SGW, wherein the response message may contain at least one of the following information: address information of the SGW, address information of the PGW, a GTP-C ID corresponding to the SGW or a GTP-C ID corresponding to the PGW.

In one or more embodiments, after the operation that the second mobility management unit sends the flag information to the SGW, the method may include that: the second mobility management unit sends a notification message to an HSS, wherein the notification message may be configured to notify the HSS that the terminal is moved from the first mobility management unit to the second mobility management unit.

In one or more embodiments, the first mobility management unit may include: an MME or an SGSN; and the second mobility management unit may include: an MME or an SGSN.

According to another aspect of the embodiments of the disclosure, another method for gateway recovery processing is further provided, which may include that: when a terminal moves from a first mobility management unit to a second mobility management unit, the first mobility management unit sends flag information to the second mobility management unit, wherein the flag information may be configured to indicate that PDN connection signaling is in a suspended state, and may be configured to trigger an SGW to send a bearer update request message to a PGW.

In one or more embodiments, the first mobility management unit may include: an MME or an SGSN; and the second mobility management unit may include: an MME or an SGSN.

According to another aspect of the embodiments of the disclosure, another method for gateway recovery processing is further provided, which may include that: when a terminal moves from a first mobility management unit to a second mobility management unit, an SGW receives flag information from the second mobility management unit, wherein the flag information may be configured to indicate that PDN connection signaling is in a suspended state; and the SGW sends a bearer update request message to a PGW under triggering of the flag information.

In one or more embodiments, the bearer update request message may carry the flag information.

In one or more embodiments, the bearer update request message may further contain a source GTP-C ID corresponding to the first mobility management unit and a destination GTP-C ID corresponding to the second mobility management unit.

In one or more embodiments, after the operation that the SGW sends the bearer update request message to the PGW under triggering of the flag information, the method may include that: the SGW sends a response message of the bearer update request message to the second mobility management unit, wherein the response message may contain at least one of the following information: address information of the SGW, address information of the PGW, a GTP-C ID corresponding to the SGW and a GTP-C ID corresponding to the PGW.

In one or more embodiments, the first mobility management unit may include: an MME or an SGSN; and the second mobility management unit may include: an MME or an SGSN.

According to one aspect of the embodiments of the disclosure, a device for gateway recovery processing is provided, which may be applied to a second mobility management unit and include: a first receiving module, configured to, when a terminal moves from a coverage area of a first mobility management unit to a coverage area of the second mobility management unit, receive flag information from the first mobility management unit, wherein the flag information may be configured to indicate that PDN connection signaling is in a suspended state; and a first sending module, configured to send the flag information to an SGW, the flag information being configured to trigger the SGW to send a bearer update request message to a PGW.

In one or more embodiments, the bearer update request message may carry the flag information.

In one or more embodiments, the flag information may be represented by an IE.

In one or more embodiments, the first mobility management unit may include: an MME or an SGSN; and the second mobility management unit may include: an MME or an SGSN.

According to another aspect of the embodiments of the disclosure, another device for gateway recovery processing is further provided, which may be applied to a first mobility management unit and include: a sending module, configured to, when a terminal moves from a coverage area of the first mobility management unit to a coverage area of a second mobility management unit, send flag information to the second mobility management unit, wherein the flag information may be configured to indicate that PDN connection signaling is in a suspended state, and may be configured to trigger an SGW to send a bearer update request message to a PGW.

In one or more embodiments, the first mobility management unit may include: an MME or an SGSN; and the second mobility management unit may include: an MME or an SGSN.

According to another aspect of the embodiments of the disclosure, another device for gateway recovery processing is further provided, which may be applied to an SGW and include: a receiving module, configured to, when a terminal moves from a coverage area of a first mobility management unit to a coverage area of a second mobility management unit, receive flag information from the second mobility management unit, wherein the flag information may be configured to indicate that PDN connection signaling is in a suspended state; and a first sending module, configured to send a bearer update request message to a PGW under triggering of the flag information.

In one or more embodiments, the bearer update request message may carry the flag information.

In one or more embodiments, the first mobility management unit may include: an MME or an SGSN; and the second mobility management unit may include: an MME or an SGSN.

According to the embodiments of the disclosure, when a terminal moves from a coverage area of a first mobility management unit to a coverage area of a second mobility management unit, the second mobility management unit receives the flag information from the first mobility management unit, wherein the flag information is configured to indicate that the PDN connection signaling is in the suspended state; and the second mobility management unit sends the flag information to the SGW, the flag information being configured to trigger the SGW to send the bearer update request message to the PGW. By the embodiments, the PGW may be notified when UE moves to a new mobility management unit, and reception of the terminal over a downlink service is further implemented.

After the drawings and detailed descriptions are read and understood, the other aspects may be comprehended.

DETAILED DESCRIPTION

The disclosure will be described below with reference to the drawings and in combination with the embodiments in detail. It is important to note that the embodiments in the application and characteristics in the embodiments may be combined without conflicts.

Figure 1:
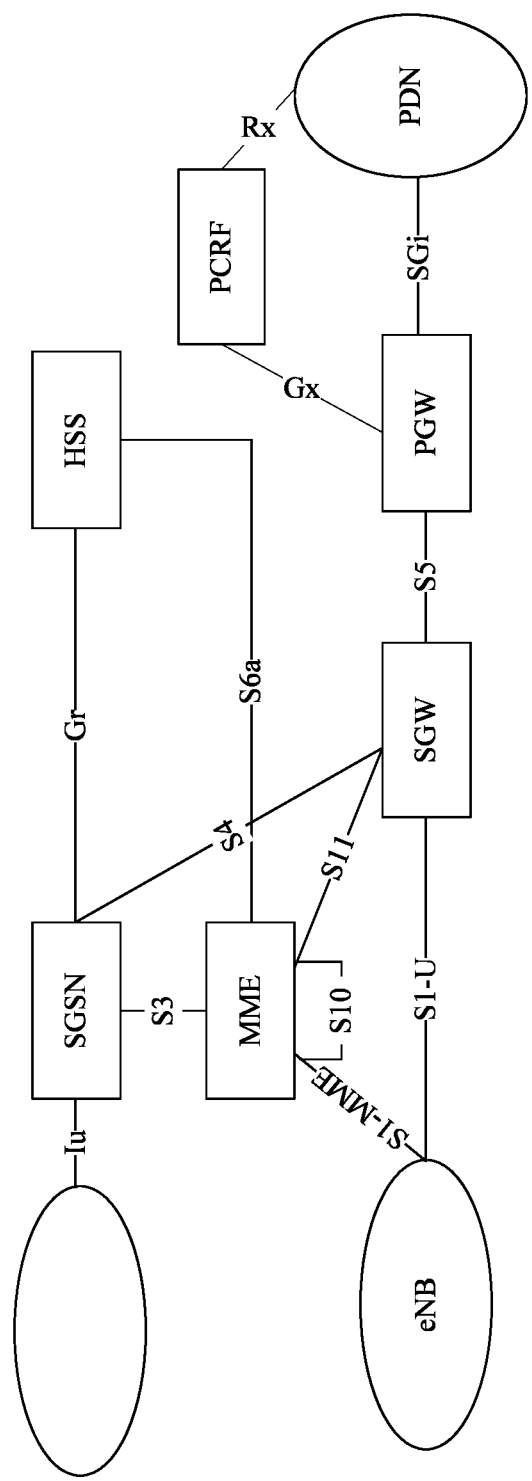
FIG. 1 is a structure diagram of an EPC system according to the related technology.
Figure 2:
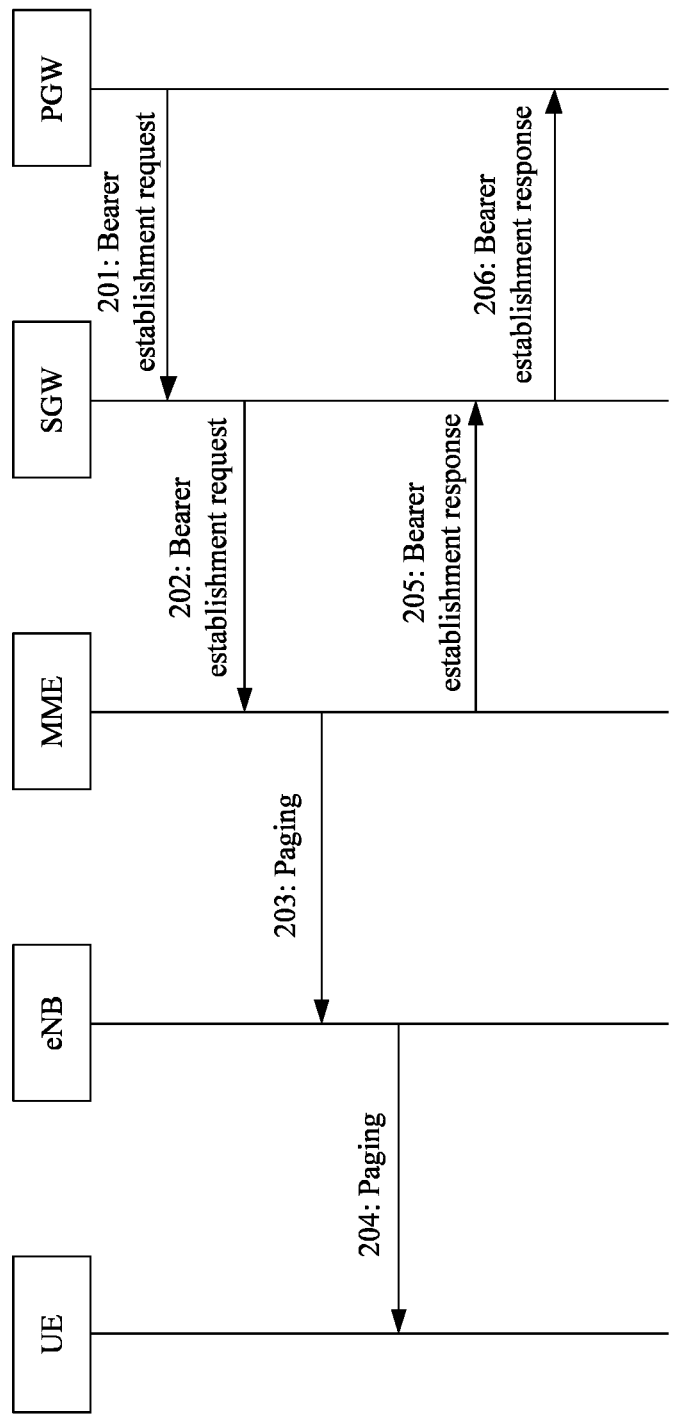
FIG. 2 is a signaling flowchart of a bearer establishment process according to the related technology.
Figure 3:
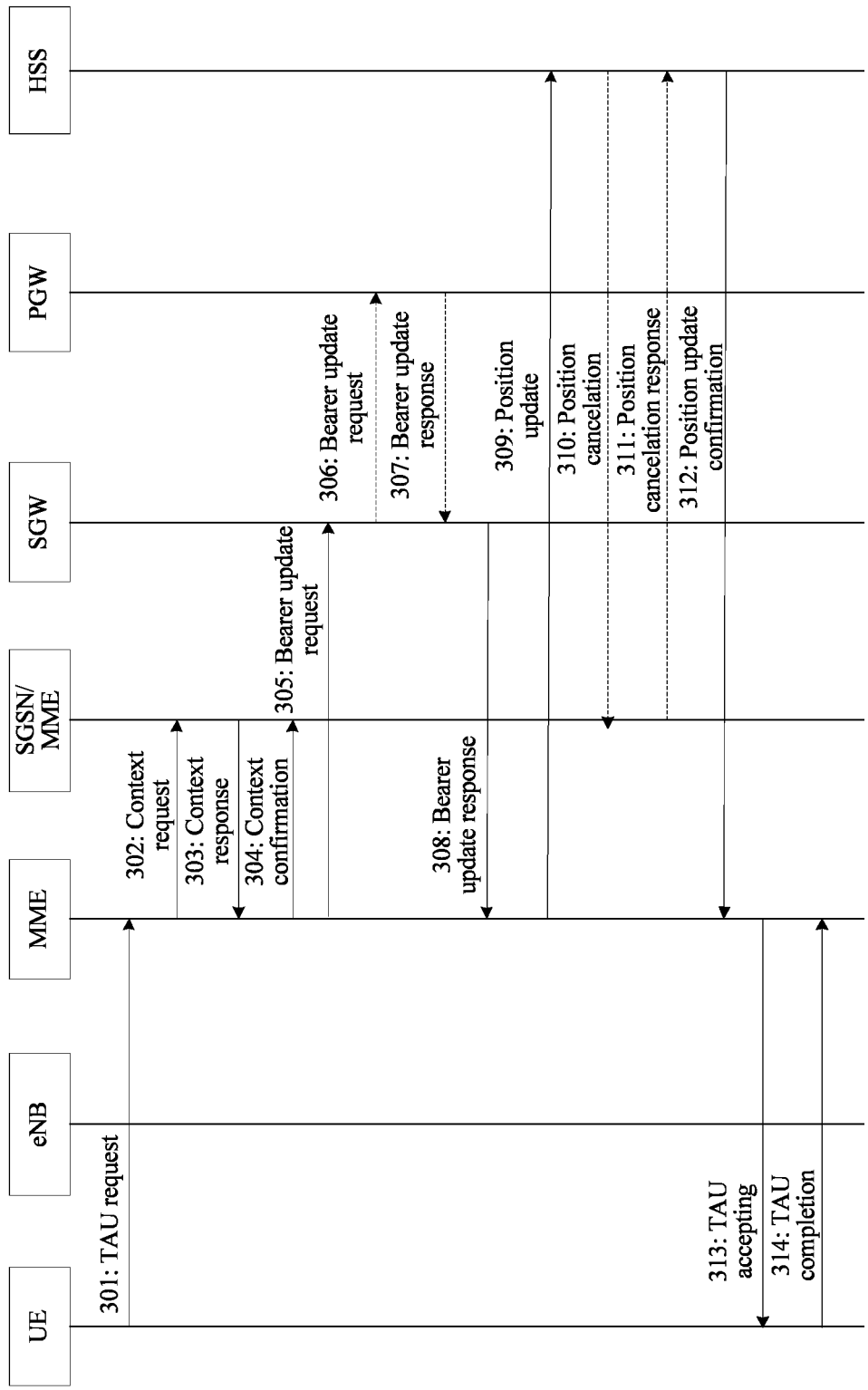
FIG. 3 is a signaling flowchart of a Tracking Area Update (TAU) flow according to the related technology.
Figure 4:
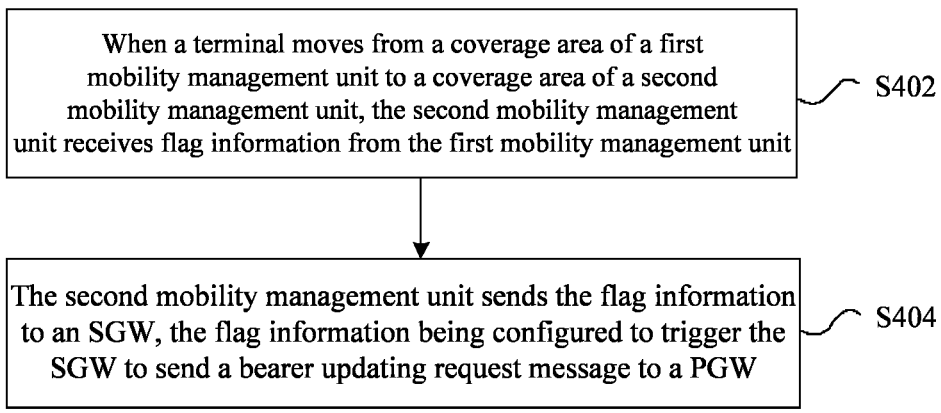
FIG. 4 is a flowchart of a method for gateway recovery processing according to an embodiment of the disclosure.

The embodiments provide a method for gateway recovery processing. FIG. 4 is a flowchart of a method for gateway recovery processing according to an embodiment of the disclosure. As shown in FIG. 4, the flow includes the following steps.

In Step S402, when a terminal moves from a first mobility management unit to a second mobility management unit, the second mobility management unit receives flag information from the first mobility management unit, where the flag information is configured to indicate that PDN connection signaling is in a suspended state.

In Step S404, the second mobility management unit sends the flag information to an SGW, the flag information being configured to trigger the SGW to send a bearer update request message to a PGW.

By the above steps, the second mobility management unit sends the flag information, received from the first mobility management unit and configured to indicate that the PDN connection signaling is in the suspended state and trigger the SGW, to send the bearer update request message to the PGW to the SGW, thereby enabling the PGW to receive the bearer update request message. Compared with the related technology where the PGW may always not initiate PDN connection signaling if the PGW does not receive a bearer update request and then it is impossible to transmit some downlink services to UE for a long time, the above steps may implement notification to the PGW when the UE moves to a new mobility management unit and further ensure reception of the terminal over a downlink service.

The flag information may be sent in multiple manners. In an optional embodiment, the bearer update request message carries the flag information, and the flag information is sent through a sending process of the bearer update request message.

In an optional embodiment, the flag information is represented by an IE.

The operation that the second mobility management unit receives the flag information from the first mobility management unit is involved in Step S402. In an optional embodiment, before the step, the second mobility management unit receives a GUTI from the terminal; and the second mobility management unit searches for the first mobility management unit according to the GUTI. Furthermore, the second mobility management unit may receive the bearer update request message and the flag information from the first mobility management unit.

In an optional embodiment, the first mobility management unit includes: an MME or an SGSN; and the second mobility management unit includes: an MME or an SGSN.

The embodiments further provide a device for gateway recovery processing. The device is configured to implement the abovementioned embodiment and optional implementations, and what has been described will not be elaborated. For example, term "module", used below, may be a combination of software and/or hardware capable of realizing a preset function. Although the device described in the following embodiment may be implemented with software, implementation with hardware or a combination of the software and the hardware is also possible and conceivable.

Figure 5:
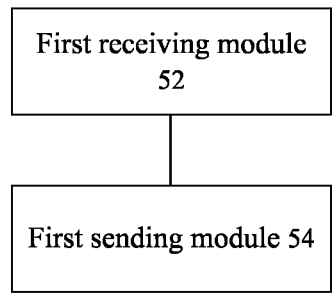
FIG. 5 is a structure block diagram of a device for gateway recovery processing according to an embodiment of the disclosure.

FIG. 5 is a structure block diagram of a device for gateway recovery processing according to an embodiment of the disclosure. The device is applied to a second mobility management unit, and, as shown in FIG. 5, includes: a first receiving module 52, configured to, when a terminal moves from a first mobility management unit to the second mobility management unit, receive flag information from the first mobility management unit, where the flag information is configured to indicate that PDN connection signaling is in a suspended state; and a first sending module 54, configured to send the flag information to an SGW, the flag information being configured to trigger the SGW to send a bearer update request message to a PGW.

In one or more embodiments, the bearer update request message carries the flag information.

In one or more embodiments, the flag information is represented by an IE.

Figure 6:
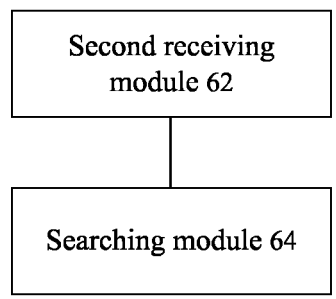
FIG. 6 is a first structure block diagram of a device for gateway recovery processing according to an embodiment of the disclosure.

FIG. 6 is a first structure block diagram of a device for gateway recovery processing according to an embodiment of the disclosure. Compared with the device shown in FIG. 5, the device shown in FIG. 6 further includes: a second receiving module 62, configured to receive a GUTI from the terminal; and a searching module 64, configured to search for the first mobility management unit according to the GUTI.

In one or more embodiments, the second receiving module 62 is further configured to receive an indication message from the terminal, where the indication message is configured to indicate whether the terminal is capable of supporting an ISR.

In one or more embodiments, the bearer update request message further contains a source GTP-C ID corresponding to the first mobility management unit and a destination GTP-C ID corresponding to the second mobility management unit.

Figure 7:
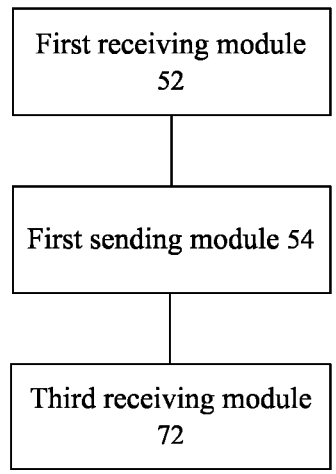
FIG. 7 is a second structure block diagram of a device for gateway recovery processing according to an embodiment of the disclosure.

FIG. 7 is a second structure block diagram of a device for gateway recovery processing according to an embodiment of the disclosure. Compared with the device shown in FIG. 5, the device shown in FIG. 7 further includes: a third receiving module 72, configured to receive a response message of the bearer update request message from the SGW, where the response message contains at least one of the following information: address information of the SGW, address information of the PGW, a GTP-C ID corresponding to the SGW and a GTP-C ID corresponding to the PGW.

Figure 8:
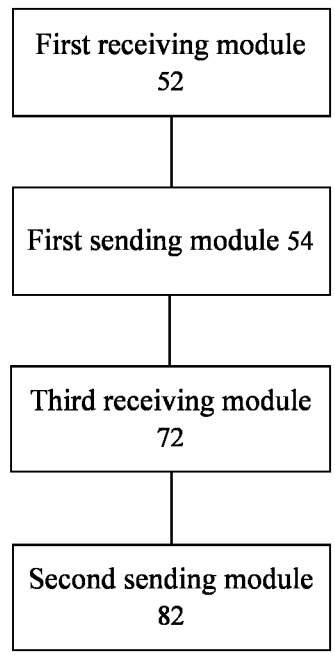
FIG. 8 is a third structure block diagram of a device for gateway recovery processing according to an embodiment of the disclosure.

FIG. 8 is a third structure block diagram of a device for gateway recovery processing according to an embodiment of the disclosure. Compared with the device shown in FIG. 5, the device shown in FIG. 8 further includes: a second sending module 82, configured to, after the second mobility management unit sends the flag information to the SGW, send a notification message to an HSS, where the notification message is configured to notify the HSS that the terminal is moved from the first mobility management unit to the second mobility management unit.

In one or more embodiments, the first mobility management unit includes: an MME or an SGSN; and the second mobility management unit includes: an MME or an SGSN.

It is important to note that each module may be implemented through software or hardware, and the latter condition may be implemented in, but not limited to, the following manners: the modules are all located in the same processor, or, the modules are located in multiple processors respectively.

The embodiments provide another method for gateway recovery processing, which includes the following step: when a terminal moves from a first mobility management unit to a second mobility management unit, the first mobility management unit sends flag information to the second mobility management unit, where the flag information is configured to indicate that PDN connection signaling is in a suspended state, and is configured to trigger an SGW to send a bearer update request message to a PGW.

By the step, the first mobility management unit sends the flag information, configured to indicate that the PDN connection signaling is in the suspended state and trigger the SGW to send the bearer update request message to the PGW, to the second mobility management unit, thereby enabling the PGW to receive the bearer update request message. Compared with the related technology where the PGW may always not initiate PDN connection signaling if the PGW does not receive a bearer update request and then it is impossible to transmit some downlink services to UE for a long time, the steps may implement notification to the PGW when the UE moves to a new mobility management unit and further ensure reception of the terminal over a downlink service.

In an optional embodiment, the first mobility management unit includes: an MME or an SGSN; and the second mobility management unit includes: an MME or an SGSN.

The embodiments further provide another device for gateway recovery processing. The device is configured to implement the abovementioned embodiment and optional implementations, and what has been described will not be elaborated. For example, the term "module", used below, may be a combination of software and/or hardware capable of realizing a preset function. Although the device described in the following embodiment may be implemented with software, implementation with hardware or a combination of the software and the hardware is also possible and conceivable.

Figure 9:
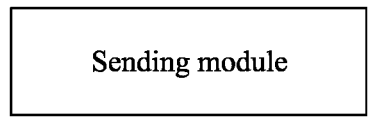
FIG. 9 is a structure block diagram of another device for gateway recovery processing according to an embodiment of the disclosure.

The other device for gateway recovery processing is applied to a first mobility management unit, and as shown in FIG. 9, includes: a sending module, configured to, when a terminal moves from the first mobility management unit to a second mobility management unit, send flag information to the second mobility management unit, where the flag information is configured to indicate that PDN connection signaling is in a suspended state, and is configured to trigger an SGW to send a bearer update request message to a PGW.

In one or more embodiments, the first mobility management unit includes: an MME or an SGSN; and the second mobility management unit includes: an MME or an SGSN.

Figure 10:
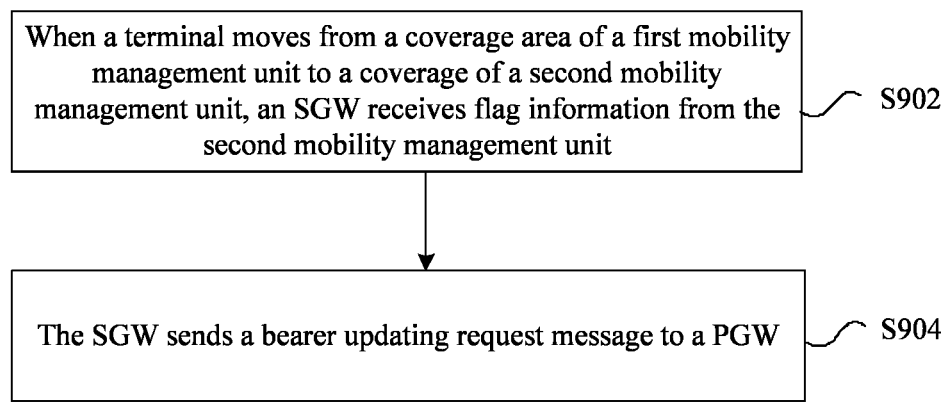
FIG. 10 is a first flowchart of a method for gateway recovery processing according to an embodiment of the disclosure.

The embodiments provide another method for gateway recovery processing. FIG. 10 is a first flowchart of a method for gateway recovery processing according to an embodiment of the disclosure. As shown in FIG. 10, the flow includes the following steps.

In Step S902, when a terminal moves from a first mobility management unit to a second mobility management unit, an SGW receives flag information from the second mobility management unit, where the flag information is configured to indicate that PDN connection signaling is in a suspended state.

In Step S904, the GW sends a bearer update request message to a PGW under triggering of the flag information.

By the steps, the SGW receives the flag information configured to indicate that the PDN connection signaling is in the suspended state and trigger the SGW to send the bearer update request message to the PGW from the second mobility management unit, thereby enabling the PGW to receive the bearer update request message. Compared with the related technology where the PGW may always not initiate PDN connection signaling if the PGW does not receive a bearer update request and then it is impossible to transmit some downlink services to UE for a long time, the steps may implement notification to the PGW when the UE moves to a new mobility management unit and further ensure reception of the terminal over a downlink service.

The flag information may be sent in multiple manners. In an optional embodiment, the bearer update request message carries the flag information.

In an optional embodiment, the bearer update request message further contains a source GTP-C ID corresponding to the first mobility management unit and a destination GTP-C ID corresponding to the second mobility management unit.

The operation that the SGW sends the bearer update request message to the PGW under triggering of the flag information is involved in Step S904. In an optional embodiment, after the step, the SGW sends a response message of the bearer update request message to the second mobility management unit, where the response message contains at least one of the following information: address information of the SGW, address information of the PGW, a GTP-C ID corresponding to the SGW and a GTP-C ID corresponding to the PGW.

In an optional embodiment, the first mobility management unit includes: an MME or an SGSN; and the second mobility management unit includes: an MME or an SGSN.

The embodiments further provide another device for gateway recovery processing. The device is configured to implement the abovementioned embodiment and optional implementations, and what has been described will not be elaborated. For example, the term "module", used below, may be a combination of software and/or hardware capable of realizing a preset function. Although the device described in the following embodiment may be implemented with software, implementation with hardware or a combination of the software and the hardware is also possible and conceivable.

Figure 11:
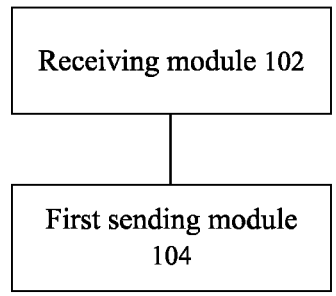
FIG. 11 is a fourth structure block diagram of a device for gateway recovery processing according to an embodiment of the disclosure.

FIG. 11 is a fourth structure block diagram of a device for gateway recovery processing according to an embodiment of the disclosure. The device is applied to an SGW, and as shown in FIG. 11, includes: a receiving module 102, configured to, when a terminal moves from a first mobility management unit to a second mobility management unit, receive flag information from the second mobility management unit, where the flag information is configured to indicate that PDN connection signaling is in a suspended state; and a first sending module 104, configured to send a bearer update request message to a PGW under triggering of the flag information.

In one or more embodiments, the bearer update request message carries the flag information.

In one or more embodiments, the bearer update request message further contains a source GTP-C ID corresponding to the first mobility management unit and a destination GTP-C ID corresponding to the second mobility management unit.

Figure 12:
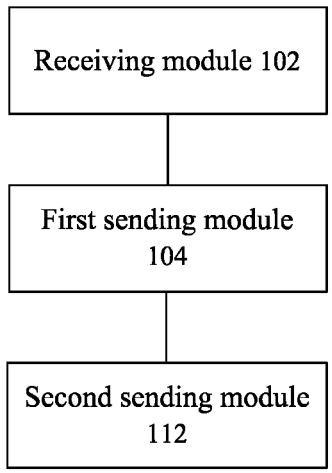
FIG. 12 is a fifth structure block diagram of a device for gateway recovery processing according to an embodiment of the disclosure.

FIG. 12 is a fifth structure block diagram of a device for gateway recovery processing according to an embodiment of the disclosure. Compared with the device shown in FIG. 11, the device shown in FIG. 12 further includes: a second sending module 112, configured to, after the bearer update request message is sent to the PGW under triggering of the flag information, send a response message of the bearer update request message to the second mobility management unit, where the response message contains at least one of the following information: address information of the SGW, address information of the PGW, a GTP-C ID corresponding to the SGW and a GTP-C ID corresponding to the PGW.

In one or more embodiments, the first mobility management unit includes: an MME or an SGSN; and the second mobility management unit includes: an MME or an SGSN.

It is important to note that each module may be implemented through software or hardware, and the latter condition may be implemented in, but not limited to, the following manners: the modules are all located in the same processor, or, the modules are located in multiple processors respectively.

An optional embodiment provides a gateway recovery notification method, which includes the following steps.

UE moves to a new mobility management unit, an original mobility management unit sends an indication about that PDN connection signaling initiated by a network is in a suspended state to the new mobility management unit in a context transmission process, and the new mobility management unit sends to an SGW a bearer update request message carrying the indication about that the PDN connection signaling initiated by the network.

In one or more embodiments, the SGW sends the bearer update request message to a PGW after receiving the indication about that the PDN connection signaling initiated by the network is in the suspended state.

Figure 13:
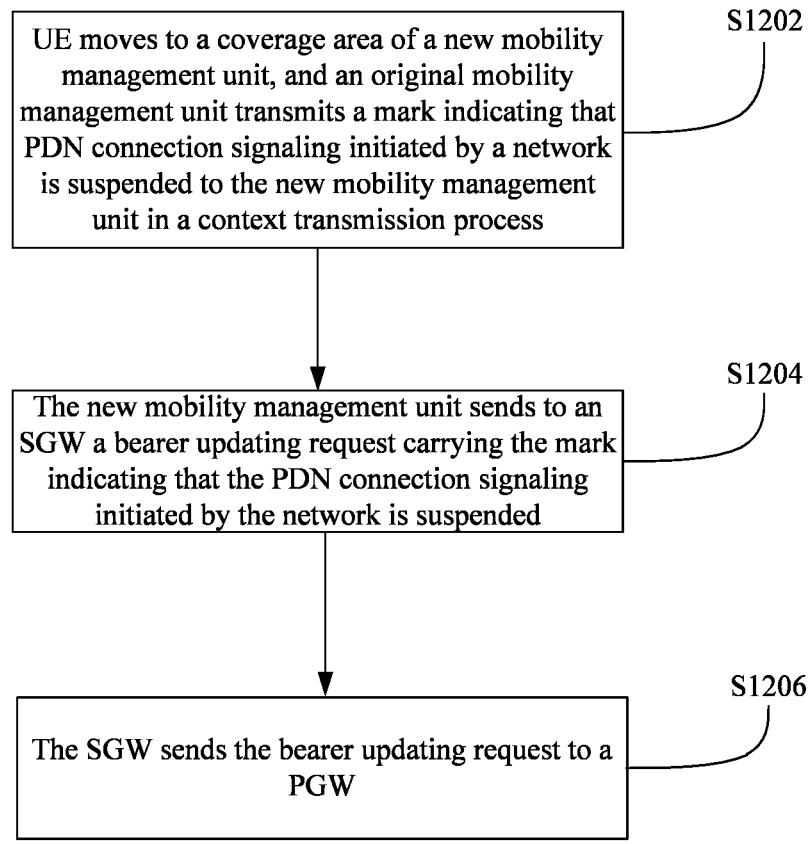
FIG. 13 is a flowchart of gateway recovery notification in a PSM according to an embodiment of the disclosure.

FIG. 13 is a system block diagram of gateway recovery notification in a PSM according to an embodiment of the disclosure. As shown in FIG. 13, the flow includes the following steps.

In Step 1202, UE moves to a coverage area of a new mobility management unit, and an original mobility management unit sends a mark indicating that PDN connection signaling initiated by a network is suspended to the new mobility management unit.

In Step 1204, the new mobility management unit sends to an SGW a bearer update request carrying the mark indicating that the PDN connection signaling initiated by the network is suspended.

In Step 1206, the SGW receives the mark in Step S1202, and the SGW sends the bearer update request to a PGW.

Figure 14:
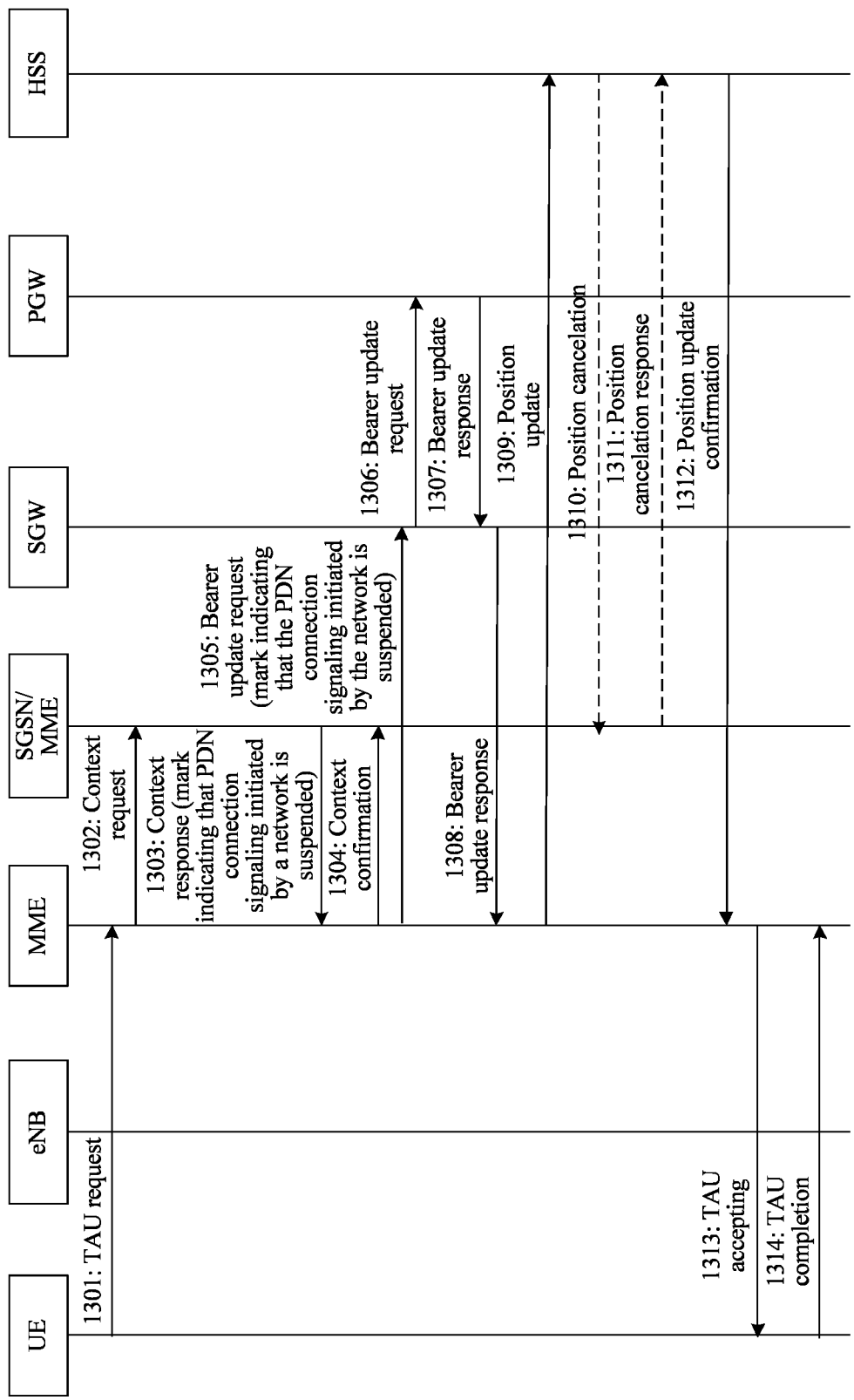
FIG. 14 is a flowchart, in which a UE is moved to a new MME, according to an embodiment of the disclosure.

FIG. 14 is a flowchart, in which a UE is moved to a new MME, according to an embodiment of the disclosure. As shown in FIG. 14, the flow includes the following steps.

In Step 1301, UE moves to an E-UTRAN coverage area under an MME, where both a GUTI allocated to the UE by an original MME and whether the UE is capable of supporting an ISR are contained in a TAU request message sent to the MME.

In Step 1302, the new MME finds the original MME according to the GUTI, and sends context request signaling for a context acquisition process.

In Step 1303, the original MME sends mobility management and bearer information of a user to the new MME, and sends, to the new MME, a returned context response message carrying a mark indicating that PDN connection signaling initiated by a network is suspended.

The mark may be represented by an independent IE. When the UE is located at the original MME and the UE is in a PSM, the PDN connection signaling initiated by the network is suspended, and a PGW may try the same bearer management flow only after receiving a bearer update request sent by an SGW.

In Step 1304, the new MME returns a context confirmation message to the original MME.

In Step 1305, the new MME initiates the bearer update request to the SGW, the request message containing a source GTP-C ID, a destination GTP-C ID, a bearer update binding relationship of the SGW and the mark indicating that the PDN connection signaling initiated by the network is suspended.

In Step 1306, the SGW sends the bearer update request to the PGW according to the mark in Step 1305, and after this step, the PGW may initiate PDN connection management signaling.

In Step 1307, the PGW updates own context and returns a bearer update response message to the SGW.

In Step 1308, the SGW returns a bearer update response to the new MME, and transmits the destination GTP-C ID specified by the SGW, own address, address and tunnel information of the PGW and the like to the new MME.

In Step 1309, the new MME notifies a position change of an HSS through a position update message.

In Step 1310, the HSS sends position cancelation signaling to the original MME.

In Step 1311, the original MME returns a position cancelation response to the HSS.

In Step 1312, the HSS confirms position update of the new MME, and transmits user subscription data to the new MME.

In Step 1313, if confirming that the UE is active in a current tracking area, the new MME sends aTAU accepting message to the UE.

In Step 1314, if the new MME allocates a new GUTI to the UE through a TAU flow, the UE may return a TAU completion message to the new MME for confirmation.

Figure 15:
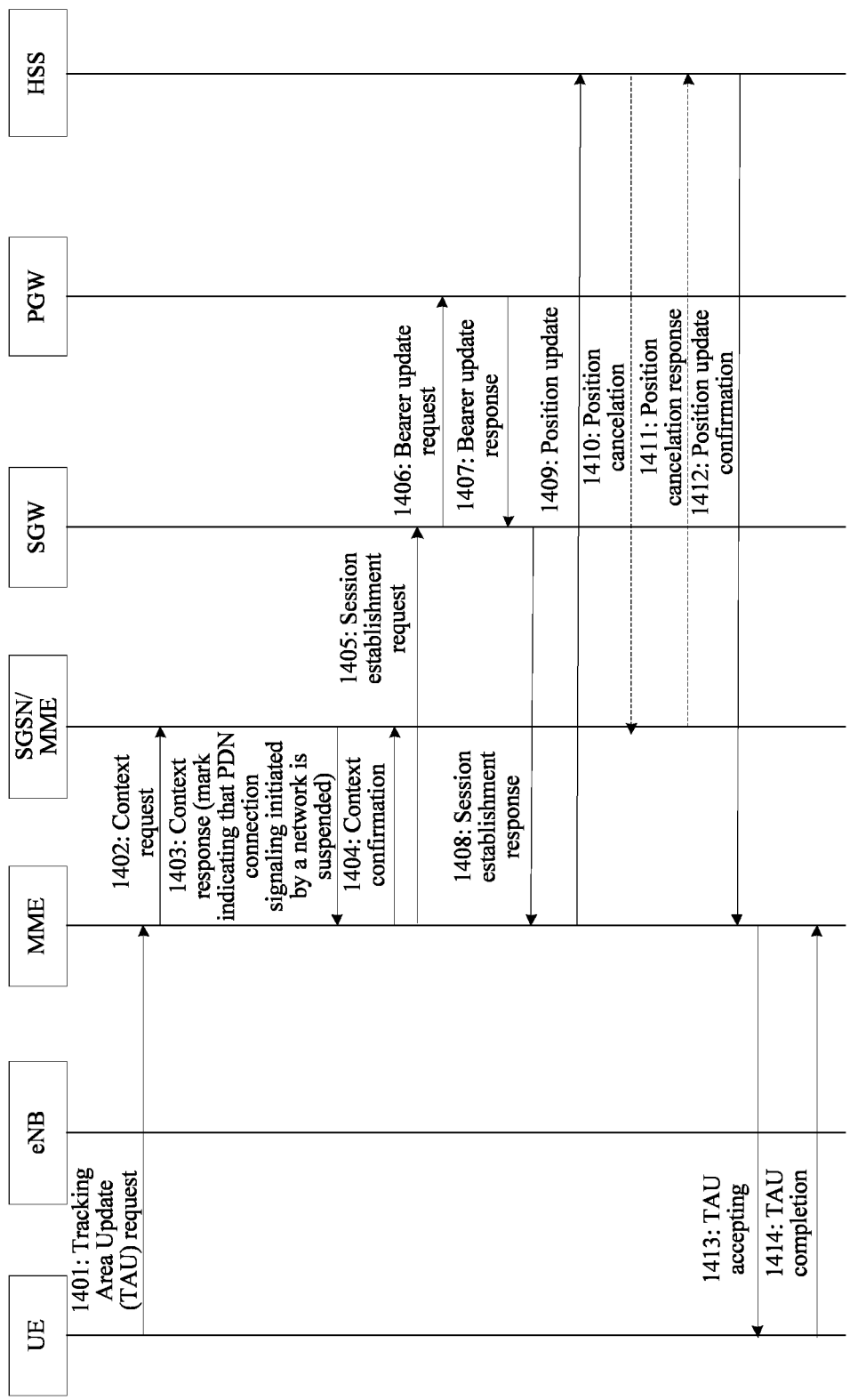
FIG. 15 is a flowchart, in which a UE is moved to a new MME and a new SGW is selected by the new MME, according to an embodiment of the disclosure.

FIG. 15 is a flowchart, in which a UE is moved to a new MME and a new SGW is selected by the new MME, according to an embodiment of the disclosure. As shown in FIG. 15, the flow includes the following steps.

In Step 1401, UE moves to an E-UTRAN coverage area under an MME, where both a GUTI allocated to the UE by an original MME and whether the UE is capable of supporting an ISR are contained in a TAU request message sent to the MME.

In Step 1402, the new MME finds the original MME according to the GUTI, and sends context request signaling for a context acquisition process.

In Step 1403, the original MME sends mobility management and bearer information of a user to the new MME, and sends, to the new MME, a returned context response message carrying a mark indicating that PDN connection signaling initiated by a network is suspended.

The mark may be represented by an independent IE. When the UE is located at the original MME and the UE is in a PSM, the PDN connection signaling initiated by the network is suspended, and a PGW may try the same bearer management flow only after receiving a bearer update request sent by an SGW.

In Step 1404, the new MME returns a context confirmation message to the original MME.

In Step 1405, the new MME selects a new SGW to serve the UE, and the new MME initiates a session establishment request to the SGW, the request message containing a source GTP-C ID and a destination GTP-C ID.

In Step S1406, the SGW sends a bearer update request to the PGW, the source GTP-C ID and the destination GTP-C ID being contained In Step 1407, the PGW updates own context and returns bearer update response information to the SGW, and after this step, the PGW may initiate PDN connection management signaling.

In Step 1408, the SGW returns a session establishment response to the new MME, and transmits the destination GTP-C ID specified by the SGW, own address, address and tunnel information of the PGW and the like to the new MME.

In Step 1409, the new MME notifies a position change of an HSS through a position update message.

In Step 1410, the HSS sends position cancelation signaling to the original MME.

In Step 1411, the original MME returns a position cancelation response to the HSS.

In Step 1412, the HSS confirms position update of the new MME, and transmits user subscription data to the new MME.

In Step 1413, if confirming that the UE is active in a current tracking area, the new MME sends aTAU accepting message to the UE.

In Step 1414, if the new MME allocates a new GUTI to the UE through a TAU flow, the UE may return a TAU completion message to the new MME for confirmation.

In the embodiment, descriptions are made as an example, in which a UE is moved to the coverage of the new MME. For a condition in which a UE is moved to a new SGSN, a processing method is similar, and thus will not be described in detail.

From the above, by the method provided by the embodiment of the disclosure for gateway recovery notification in the PSM, the PGW is notified when the UE moves to a new mobility management unit, and reception of a terminal over a downlink service is further ensured.

In another embodiment software is further provided, which is configured to execute the embodiments described in the abovementioned embodiments and optional implementations.

In another embodiment, a storage medium is further provided, in which the software is stored, the storage medium including, but not limited to: an optical disk, a floppy disk, a hard disk, an erasable memory and the like. A computer-executable instruction is stored in the storage medium, and the computer-executable instruction is configured to execute the method.

Obviously, those skilled in the art should know that each module or each step of the disclosure may be implemented by a universal computing device, and the modules or steps may be concentrated on a single computing device or distributed on a network formed by a plurality of computing devices, and may be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the disclosure is not limited to any specific hardware and software combination.

The above is only the optional embodiment of the disclosure and not intended to limit the scope of protection of the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

By the embodiments, the PGW may be notified when UE moves to a new mobility management unit, and reception of the UE over a downlink service is further implemented.

The invention claimed is:

1. A method for gateway recovery processing, comprising:

receiving, by a first mobility management unit, Packet Data Network (PDN) connection signaling initiated by a network, and triggering a paging procedure for a terminal;

in response to determining that the paging procedure fails, setting and storing, by the first mobility management unit, flag information, wherein the flag information is used to indicate that the PDN connection signaling initiated by the network is in a suspended state; and in a case where the terminal moves from a coverage area of the first mobility management unit to a coverage area of a second mobility management unit, sending, by the first mobility management unit, the flag information indicating that the PDN connection signaling initiated by the network is in a suspended state to the second mobility management unit, wherein the flag information is further used for the second mobility management unit to trigger a Serving Gateway (SGW) to send a bearer update request message to a PDN Gateway (PGW).

2. The method according to claim 1, wherein the first mobility management unit comprises: a Mobility Management Entity (MME) or a Serving General Packet Radio Service (GPRS) Support Node (SGSN); and the second mobility management unit comprises: an MME or an SGSN.

3. A device for gateway recovery processing, applied to a first mobility management unit, comprising:

a processor; and a memory for storing instructions executable by the processor, wherein when executing the instructions, the processor is configured to:

receive Packet Data Network (PDN) connection signaling initiated by a network, and trigger a paging procedure for a terminal;

in response to determining that the paging procedure fails, set and store flag information, wherein the flag information is used to indicate that the PDN connection signaling initiated by the network is in a suspended state; and in a case where the terminal moves from the coverage area of the first mobility management unit to a coverage area of a second mobility management unit, send the flag information indicating that the PDN connection signaling initiated by the network is in a suspended state to the second mobility management unit, wherein the flag information is further used for the second mobility management unit to trigger a Serving Gateway (SGW) to send a bearer update request message to a PDN Gateway (PGW).

4. The device according to claim 3, wherein the first mobility management unit comprises: a Mobility Management Entity (MME) or a Serving General Packet Radio Service (GPRS) Support Node (SGSN); and the second mobility management unit comprises: an MME or an SGSN.

5. A non-transitory computer-readable storage medium, having stored thereon instructions which, when executed by a processor, cause the processor to perform a method comprising:

receiving, by a first mobility management unit, Packet Data Network (PDN) connection signaling initiated by a network, and triggering a paging procedure for a terminal;

in response to determining that the paging procedure fails, setting and storing, by the first mobility management unit, flag information, wherein the flag information is used to indicate that the PDN connection signaling initiated by the network is in a suspended state; and in a case where the terminal moves from a coverage area of the first mobility management unit to a coverage area of a second mobility management unit, sending, by the first mobility management unit, the flag information indicating that the PDN connection signaling initiated by the network is in a suspended state to the second mobility management unit, wherein the flag information is further used for the second mobility management unit to trigger a Serving Gateway (SGW) to send a bearer update request message to a PDN Gateway (PGW).

6. The storage medium according to claim 5, wherein the first mobility management unit comprises: a Mobility Management Entity (MME) or a Serving General Packet Radio Service (GPRS) Support Node (SGSN); and the second mobility management unit comprises: an MME or an SGSN.

* * * * *